United States Patent
Melick et al.

(10) Patent No.: US 7,376,357 B2
(45) Date of Patent: May 20, 2008

(54) SYSTEM AND METHOD OF USING VARIABLE PULSES FOR SYMBOLOGY

(75) Inventors: Bruce D. Melick, Cedar Rapids, IA (US); David M. Snyder, Cedar Rapids, IA (US); Leslie D. Baych, Cedar Rapids, IA (US)

(73) Assignee: Lightwaves Systems, Inc., Cedar Rapids, IA (US)

( * ) Notice: Subject to any disclaimer, the term of this patent is extended or adjusted under 35 U.S.C. 154(b) by 0 days.

(21) Appl. No.: 10/963,034

(22) Filed: Oct. 11, 2004

(65) Prior Publication Data

US 2005/0063708 A1  Mar. 24, 2005

Related U.S. Application Data

(63) Continuation of application No. 10/874,652, filed on Jun. 23, 2004, which is a continuation of application No. 09/812,545, filed on Mar. 20, 2001.

(60) Provisional application No. 60/190,832, filed on Mar. 21, 2000.

(51) Int. Cl.
*H04B 10/04* (2006.01)
*H04B 10/12* (2006.01)
*H03K 7/08* (2006.01)
*H03K 7/04* (2006.01)

(52) U.S. Cl. ............... 398/189; 398/183; 375/238; 375/239; 375/353

(58) Field of Classification Search ........ 398/182, 398/190, 191, 189, 183; 375/246, 253, 238, 375/239, 353

See application file for complete search history.

(56) References Cited

U.S. PATENT DOCUMENTS 4,640,158 A * 2/1987 Link et al. ............... 82/129
4,866,737 A * 9/1989 Seifried ................... 375/238
5,050,189 A   9/1991 Cox et al.

(Continued)

FOREIGN PATENT DOCUMENTS

DE  195 10 304 C1 * 3/1995

OTHER PUBLICATIONS

"The Essential Guide to Telecommunications, 2nd Edition," by Annabel Z. Dodd, 2000, Prentice Hall PTR, pp. 14-17 and 188-239.

(Continued)

*Primary Examiner*—M. R. Sedighian
(74) *Attorney, Agent, or Firm*—McKee, Voorhees & Sease, P.L.C.

(57) ABSTRACT

A method and system for storing and transmitting data using variable pulse symbology over a fiber optic or ultra wide band system. Data is stored in memory, accessed and transformed into an electronic or photonic pulse and/or space which has a variable duration, the duration corresponding to the bit of data to be transmitted. The duration of the pulse and/or space is selected from a list of predetermined durations, each corresponding to a different base 10 number. The pulses and spaces may both be used to represent data, or the spaces may be used for meta data. Variable duration pulses may also be used to store data on an optical storage medium or fiber optic cable.

20 Claims, 1 Drawing Sheet

U.S. PATENT DOCUMENTS

Figure 1:
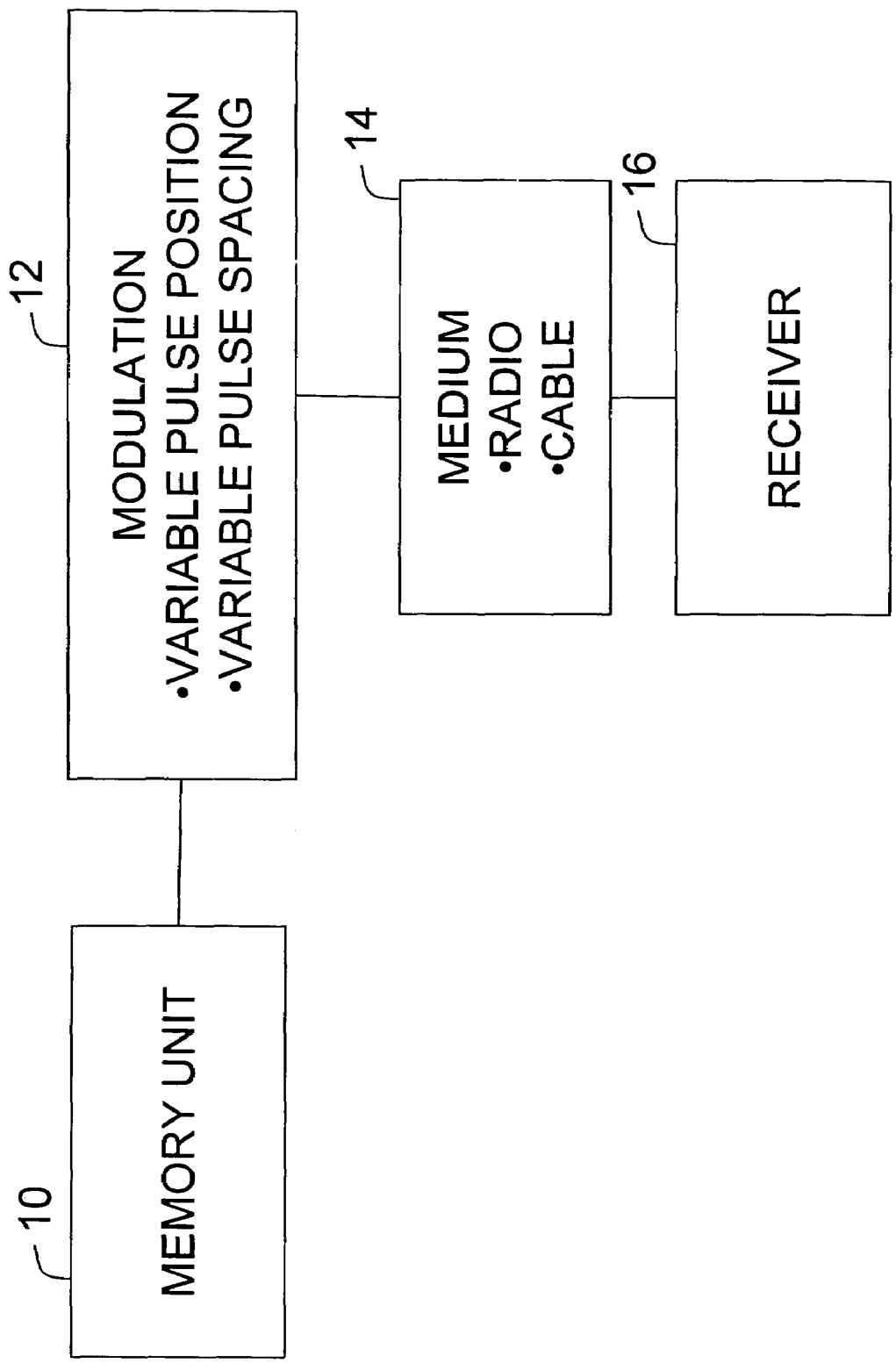

| | | | | |
|---|---|---|---|---|
| 5,666,379 | A | * | 9/1997 | Ovard et al. ............... 375/239 |
| 6,363,179 | B1 | * | 3/2002 | Evans et al. ............... 382/309 |
| 6,496,104 | B2 | | 12/2002 | Kline |
| 6,603,818 | B1 | * | 8/2003 | Dress et al. ............... 375/295 |
| 6,678,321 | B1 | * | 1/2004 | Graham et al. ............ 375/238 |
| 6,781,530 | B2 | | 8/2004 | Moore |
| 6,782,048 | B2 | | 8/2004 | Santhoff |
| 2001/0053175 | A1 | | 12/2001 | Hoctor et al. |
| 2001/0055353 | A1 | * | 12/2001 | Rybicki et al. ............ 375/353 |
| 2002/0018514 | A1 | | 2/2002 | Haynes et al. |

OTHER PUBLICATIONS

"GSM Cellular Radio Telephony," by Joachim Tisal, May 1997, John Wiley & Sons, Inc., pp. 43-98.

"Being Digital," by Nicholas Negroponte, 1995, Vintage Books, pp. 11-85 and 127-136.

"Future Talk, The Changing Wireless Game," by Ron Schneidermann, 1997, IEEE Press Marketing, pp. 89-130 and 135-141.

"Video Compression: A Codec Primer," http://hotwired.lycos.com/webmonkey/97/34/index1a_page5.html?tw=multimedia.

"BCD Arithmetic, a tutorial," by Douglas W. Jones, http://www.cd.uiowa.edu/~jones/bcd/bcd.html.

The Unicode® Standard: A Technical Introduction, http://www.unicode.org/unicode/standard/principles.html.

"CD/ROM—An extension of the CD audio standard," by Professor Kelin J. Kuhn, http://www.ee.washington.edu/conselec/CE/kuhn/cdrom/95x8.htm.

"Other disk formats of interest," by Professor J. Kuhn, http://www.ee.washington.edu/conselec/CE/kuhn/otherformats/95x9.htm.

"Data Transmission," http://www.cs.ucf.esu/courses/cda3102.chapter4.html.

"Data Representation," http://home.olemiss.edu/~misbook/hm1.htm.

"Data Transmission—Communications-Data Transmission," http://home.olemiss.edu/~misbook/cm6.htm.

Article entitled "ASCII Chart", http://www.jimprice.com/jim-asc.htm; Feb. 10, 2000, pp. 1-9.

Article entitled "A Brief History of Character Codes in North America, Europe, and East Asia," http://tronweb.super-nova.co.jp/characcodehist.htm; Feb. 10, 2000, pp. 1-22.

Article entitled "What is Unicode?" http://www.unicode.org/unicode/standard/WhatIsUnicode.htm; Feb. 10, 2000, pp. 1-2.

* cited by examiner

SYSTEM AND METHOD OF USING VARIABLE PULSES FOR SYMBOLOGY

This application claims priority to U.S. application Ser. No. 09/812,545 filed Mar. 20, 2001, which is a conversion of Provisional Application Ser. No. 60/190,832 filed Mar. 21, 2000, both of which are hereby incorporated by reference in their entirety.

BACKGROUND OF THE INVENTION

1. Field of the Invention

The present invention relates generally to the use of character codes to telecommunicate data. More specifically, and in particular, the present invention comprises a system and method for the use of variable duration pulses and/or variable duration spaces between electronic or photonic pulses, each representing a different base 10 number, which are transmitted using an ultra wide band or fiber optic system.

2. Problems in the Art

Currently, computers create, store, and access data which is coded using the binary language of 1's and 0's. Computers routinely access binary coded files remotely via a telecommunication network. Computers and telecommunication networks use the same binary language to create, store, and access data. At the stroke of a key a computer transforms various forms of input into a numerical representation. Many different methods of transformation have been put into effect. Morse Code was perhaps the first such method to be widely used. Today, the majority of systems all use a binary language or code to transform various forms of input into numerical representations and vice versa.

Much like Morse Code, binary numbers use only two variants to represent vast quantities of textual data. For instance, in 7-bit ASCII code, the textual number "3" is represented in binary as "0110011" and the textual letter "A" is represented in binary as "1000001". Each bit in the seven bit representation screen is either a "1" or a "0".

Problems arose with the use of many different types of binary encoding. The many different types of binary coding were not consistent and the many types of human language resulted in different textual representations from the same set of binary numbers. For instance, ASCII and ISO 646 were used for English-language data, while ISO 2022, an extension of ISO 646, is used for Latin based scripts common in Europe which tend to employ various accent marks. This new standard became known as "Latin-1". Similarly, there is now "Latin-2", "Latin-3", etc.

A solution was sought. That solution has appeared in what has become known as "UNICODE". After several attempts at a multilingual system, UNICODE, short for Unification Code, was developed to provide a unique number identifier to every possible piece of textual data. Using a 16-bit encoding means that code values are available for more than 65,000 characters. While this number is sufficient for coding the characters used in the major languages of the world, the UNICODE Standard and ISO/IEC 10646 provide the UTF-16 extension mechanism (called surrogates in the UNICODE Standard), which allows for the encoding of as many as 1 million additional characters without any use of escape codes. This capacity is sufficient for all known character encoding requirements, including full coverage of all historic scripts of the world.

Though UNICODE has become the multilingual code of choice for American manufacturers, several groups in the Far East have proposed and implemented a UNIX version of a multilingual code. This code uses an editor known as Mule, for MULtilingual Enhancement to GNU Emacs). This editor uses many escape sequences to provide a multilanguage capability.

No matter which multilingual code becomes the worldwide standard, all of them must be eventually converted into binary numbers for use on computers and transfer across networks and the internet. As the individual universal code numbers increase in size, so must their binary number representations. Further, if a system based on escape sequences is used, many levels of representation may be necessary. This, too, requires longer binary representations. Further, current mechanical drives, such as standard computer hard drives, store textual representations as binary numbers. Longer textual representations require longer binary representations which in turn requires more physical space.

The longer the binary representation, the longer the process time and transfer time for data. As most current applications use some type of buffering when transmitting data, the limited 1's and 0's of binary also require large areas in which buffering may take place. As more and more systems move to wireless methods of communications and storage, transfer and processing time will become critical. It is therefore desirable to provide a method of minimizing the size of data representations.

There is therefore a need for a character code and transmission system and method which avoids these and other problems.

FEATURES OF THE INVENTION

A general feature of the present invention is the provision of a method and system which overcomes the problems found in the prior art.

A further feature of the present invention is the provision of a method and system capable of transmitting and processing a larger amount of more relevant data per unit time.

Another feature of the present invention is the provision of a method and system which replaces the current binary coded symbols with variable duration electronic or photonic pulses.

A still further feature of the present invention is the provision of a system and method which modifies the current UNICODE standard character sets by representing the numbers, 0 through 9, with a single variable duration electronic or photonic pulse.

Another feature of the present invention is the provision of a method and system which modifies the UNICODE standard character sets for symbols other than numbers with a combination of variable duration electronic or photonic pulses.

A still further feature of the present invention is the provision of a system and method which modifies the current UNICODE standard character sets by representing the numbers, 0 through 9, with a single variable duration space between electronic or photonic pulses.

A still further feature of the present invention is the provision of a method and system which modifies the UNICODE standard character sets for symbols other than number with a combination of variable duration spaces between electronic or photonic pulses.

A still further feature of the present invention is the provision of a method and system which modifies the UNICODE standard character sets for symbols other than number with a combination of variable duration pulses and variable duration spaces between electronic or photonic pulses.

A still further feature of the present invention is the provision of a system and method which modifies the current ASCII standard character sets by representing the numbers, 0 through 9, with a single variable duration electronic or photonic pulse.

Another feature of the present invention is the provision of a method and system which modifies the ASCII standard character sets for symbols other than numbers with a combination of variable duration electronic or photonic pulses.

A still further feature of the present invention is the provision of a system and method which modifies the current ASCII standard character sets by representing the numbers, 0 through 9, with a single variable duration space between electronic or photonic pulses.

A still further feature of the present invention is the provision of a method and system which modifies the ASCII standard character sets for symbols other than number with a combination of variable duration spaces between electronic or photonic pulses.

A still further feature of the present invention is the provision of a method and system which modifies the ASCII standard character sets for symbols other than number with a combination of variable duration pulses and variable duration spaces between electronic or photonic pulses.

A still yet further feature of the present invention is the provision of a method and system which modifies the UNICODE standard character sets for all symbols and numbers by time modulating the start position of an electronic or photonic pulse as related to its neutral position.

A still yet further feature of the present invention is the provision of a method and system which modifies the ASCII standard character sets for all symbols and numbers by time modulating the start position of an electronic or photonic pulse as related to its neutral position.

Another feature of the present invention is the provision of a system and method which can improve buffering time and reduce needed buffering space.

These, as well as other features and advantages of the present invention, will become apparent from the following specification and claims.

SUMMARY OF THE INVENTION

The present invention relates generally to the use of character codes to telecommunicate data. More specifically, and in particular, the present invention comprises a system and method for the use of variable duration pulses and/or variable duration spaces between electronic or photonic pulses, each representing a different base 10 number, which are transmitted using an ultra wide band or fiber optic system. Optical storage mediums such as, but not limited to, CD-ROMs and DVDs could also use variable length pits and/or variable length spaces between pits, each representing a different base 10 number. Thus, the present invention can represent the value contained in any word for any format used for music, graphics, data storage, video, etc. for CD, DVD, Laser Discs, etc., mediums.

Current UNICODE representations are listed in tables which may be stored electronically in a 256×256 array. A character code is assigned to each code element defined by the UNICODE standard. Each of these character codes is currently represented by a binary number. The present invention uses variable length pulses to represent all singular numerical digits 0 through 9. As each character in UNI-CODE is assigned a unique number, the variable duration pulses of the present invention send the actual number of the UNICODE character in an overall shorter string of numbers which may be read directly, rather than a string of binary numbers which must be further interpreted.

The coding system of the present invention is based upon a series of pulses transmitted and received over an ultra wide band and/or fiber optic system. Currently, Time Domain, Inc. has developed an impulse radio system which incorporates time modulated ultra wide band technology. Impulse radio systems are described in a series of patents, including U.S. Pat. No. 4,641,317 (issued Feb. 3, 1987), U.S. Pat. No. 4,813,057 (issued Mar. 14, 1989), U.S. Pat. No. 5,363,108 (issued Nov. 8, 1994), and U.S. Pat. No. 6,031,862 (issued Feb. 29, 2000) all to Larry W. Fullerton. Other types of ultra wide band systems are described in U.S. Pat. No. 5,901,172 to Robert J. Fontana, et al, and U.S. Pat. No. 6,026,125 to J. Frederick Larrick, Jr., et al. These patent documents are herein incorporated by reference.

As a time modulated system sends out a signal or pulse, it varies the position of the pulse in time or offsets the pulse from its original location, thus varying the pulse to pulse interval on a pulse to pulse basis. Currently the interval which is varied is large enough to allow a series of pulses or a string to be offset as a group prior to the next pulse or string being sent.

Further, each pulse may be elongated to last for a predetermined and programmable length of time. Thus, the offset of the pulse may be used for additional security purposes rather than as a means with which to transmit data. The length of the pulse becomes the data which is sent. By varying the length of the pulse, data may be transmitted using more than the 0 or 1 used in binary language.

Ultra wide band systems can detect the start of a pulse, and the system may be programmed to listen for the end of the pulse which may vary in duration according to programming. In the preferred embodiment of the present invention ten variable duration pulses and/or ten variable duration spaces between pulses are used to represent numbers 0-9. For example, the number 1 is a pulse of 50 pico seconds in duration. Other numbers and their corresponding pulse durations are shown in Chart 1.

In an alternate embodiment of the present invention a constant duration pulse is broadcast at varying times from the pulse neutral position to represent numbers 0-9, as shown in Chart 8. This embodiment would have particular benefit in a time modulated, ultra wideband system.

DETAILED DESCRIPTION OF THE PRESENT INVENTION

The present invention relates in general to a unique method for representing data used by the telecommunication and computer industries. More specifically and in particular, the present invention is a new standard symbology comprised of variable duration pulses and/or variable duration spaces between pulses that can be used in a variety of ways to represent ASCII and UNICODE symbols. These variable duration pulses and/or variable duration spaces between pulses can be electronic or photonic depending on the transmission media.

The present invention replaces the current de facto standard of binary coding of information for use by computers and telecommunications, by instead representing each number, 0 through 9, with a single variable duration pulse and/or variable duration space between pulses. The first embodiment of the present invention includes variable duration pulses and/or variable duration spaces between pulses representing numbers, 0 through 9, and combination of variable duration pulses and/or variable duration spaces between pulses to represent all other standard UNICODE symbols.

The system of the present invention includes an impulse radio transceiver which can generate a variable duration pulse and/or a variable duration space between pulses in the following manner. Combinations of numbers, 0 through 9, which represent bits of digital input data, such as ASCII or UNICODE, are stored in a memory unit. The digital output, numbers 0 through 9, would be assigned an address in a memory unit. As a result, upon being addressed, a discrete output number would be fed to a Digital/Analog converter unit. The Digital/Analog converter unit would then output an analog signal proportional to the input number (see Chart 1) which would then be fed to a trigger generator. As an example, the trigger generator, e.g., an avalanche mode operated transistor, would provide a sharply rising electrical output at the 10,000 Hz rate or a like response of light output, e.g., by ultraviolet laser, dependant upon the transmitter to be driven.

An input signal, which is a proportionally variable duration pulse and/or a variable duration space between pulses, representative of a number, 0 through 9, is fed to a trigger generator and rapidly turns "on" a switch for a proportional amount of time, thus creating electronic or photonic pulses. The switch, for example, may be an electrically operated or light operated switch, such as a diamond switch in response to an ultraviolet laser triggering device via fiber optic. Importantly, it must be capable of switching in a period of a nanosecond or less. It is then switched "on" to discharge a broadcast antenna which was earlier charged from a power source, for example in the range of 100 to 5,000 volts. The switch may also discharge its output to a fiber optic cable. Such output allows data to travel at the speed of light rather than the speed of sound. Further, through the use of a repeater, data stored in the form of light pulses and/or spaces therebetween may be stored on a loop of fiber optic cable.

Storage on a loop of fiber optic cable may occur by turning a repeater "on" and pulses of data may be accessed at any time by viewing the looped signal or pulses input to the repeater through well known programming methods. The data may be altered by adjusting the output of the repeater through well known programming methods to incorporate the desired changes, thus saving the data to the loop.

Similarly, the output of the switch may be used to generate pits on a compact or digital versatile disk or any other type of optical storage media. The recording lasers which currently are pulsed for constant durations of time to represent a "1" or a "0" are instead pulsed for a variable amount of time, thus generating pits, and spaces between pits, which are of varying lengths representing data symbology based on variable duration pulses and/or variable duration spaces.

These proportionally variable duration pulses and/or variable duration spaces between pulses, are detected by an impulse radio receiver or other transceiver that has been programmed to capture and interpret such pulses and/or spaces. The present invention uses variable duration pulses and/or variable duration spaces between pulses for coding to achieve a more efficient universal character set. Single variable duration pulses and/or variable duration spaces between pulses that are mathematically significant and relate to the numbers, 0 through 9, are used in conjunction with a character set like ASCII, or an expanded universal character set like UNICODE.

The first embodiment of the present invention includes single variable duration pulses and/or variable duration spaces between pulses representing numbers, 0 through 9, and combinations of variable duration pulses and/or variable duration spaces between pulses to represent all other standard UNICODE symbols.

First Embodiment

The first embodiment of the present invention is a modification of the UNICODE standard symbology. This modification represents the numbers, 0 through 9, using only a single variable duration pulse and/or variable duration space between pulses. Computers using this modification perform base 10 math. Base 10 math is more efficient and up to eight times faster than the base 2 math now required with binary symbology. All other standard UNICODE symbols would be represented by combinations of variable duration pulses and/or variable duration spaces between pulses as opposed to a sixteen digit binary number. The main advantage of UNICODE is a standard symbol set can be used by computers for universal data interchange. One example of a scheme to use single variable duration pulses and/or variable duration spaces between pulses to represent numbers, 0 through 9, is shown in Chart 1:

CHART 1

| NUMBER | PULSE DURATION AND/OR SPACE DURATION BETWEEN PULSES (PICO-SECONDS) |
| --- | --- |
| 1 | 50 |
| 2 | 100 |
| 3 | 150 |
| 4 | 200 |
| 5 | 250 |
| 6 | 300 |
| 7 | 350 |
| 8 | 400 |
| 9 | 450 |
| 0 | 500 |

It is important to note that in the scheme represented in Chart 1, the following mathematically significant relationship exists:

Integer (1-9)=integer X base pulse duration (50 picoseconds)

Zero=500 pico-seconds

Even though Chart 1 depicts the above relationship, it should be obvious to those skilled in the art that any interval of pulse timing can be used. For example, the base pulse duration and/or space duration between pulses could be 40 pico-seconds, or 100.7 pico-seconds, or any other duration.

This relationship can be used for base 10 computing without converting from any of the commonly used math schemes such as, base 2, octal or hexadecimal in a computer.

The example below in Chart 2, illustrates adding the numbers 347 to 226 to 151 by summing the pulse duration and/or space duration between pulses in the ones column, the tens column, and the hundreds column.

CHART 2

| FUNCTION | PULSE AND/OR SPACE COUNT (HUNDREDS) | PULSE AND/OR SPACE COUNT (TENS) | PULSE AND/OR SPACE COUNT (ONES) |
|---|---|---|---|
| 347 | 3 | 4 | 7 |
| +226 | 2 | 2 | 6 |
| +151 | 1 | 5 | 1 |
| Accumulated Total | 6 | 11 | 14 |
| Interpreted As | 6(100s) | 1(100s) 1(10s) | 1(10s) 4(1s) |
| Answer Analog = 724 | 7(100s) | 2(10s) | 4(1s) |

Chart 3 represents information contained in Chart 2 using current binary coding methods.

CHART 3

| FUNCTION | EIGHT BIT BINARY (HUNDREDS) | EIGHT BIT BINARY (TENS) | EIGHT BIT BINARY (ONES) |
|---|---|---|---|
| 347 | 00000011 | 00000100 | 00000111 |
| +226 | 00000010 | 00000010 | 00000110 |
| +151 | 00000001 | 00000101 | 00000001 |
| Accumulated Total | 00000110 | 00001011 | 00001110 |
| Interpreted As | 00000110(100s) | 00000001(100s) 00000001(10s) | 00000001(10s) 00000100(1s) |
| Answer Analog = 724 | 7(100s) | 2(10s) | 4(1s) |

As an example, in Chart 2 the numbers 347, 226, and 151 are each represented by 3 pulses and/or spaces between pulses of data. In Chart 3 the numbers 347, 226, and 151 are each represented by 24 bits of data. Comparing the amounts of data in Charts 2 and 3, it is obvious the present invention's variable pulsed symbology method requires fewer pulses and/or spaces than the standard binary number method, by a ratio of 1 to 8, or $\frac{1}{8}^{th}$. The inverse of this ratio would indicate that the amount of relevant information processed or transmitted could increase by a factor of 8. This increase in relevant information relates to more efficient use of symbols in computers and telecommunications.

If the numbers in Chart 3 were represented by the UNICODE standard character set, the numbers, 0 through 9 would be represented by sixteen digit binary numbers. Therefore, the ratio of pulses and/or spaces to bits in this scenario would be 1 to 16, or $\frac{1}{16}^{th}$. The inverse of this ratio would indicate that the amount of relevant information processed or transmitted could increase by a factor of 16.

Another application of the present invention would include Internet Protocol (IP) addresses used in telecommunications. Current IP addresses consist of 32 bits of binary numbers. The present invention can represent an IP address with 12 variable duration pulses and/or variable duration spaces between pulses.

There are more computing operations required to process binary numbers mathematically than when using base 10 numbers. The exact number of operations will differ with each computation due to the number of values involved or the operation that is being computed. Using the method described in the present invention, the number of processing operations will be fewer when using variable pulse symbology to represent numbers in base 10.

The present invention is a modification to UNICODE standard character sets described in The UNICODE® Standard A Technical Introduction. This modification changes the representation of numbers, 0 through 9, in any version of UNICODE standard character sets from a sixteen digit binary number to a single variable duration pulse and/or variable duration space between electronic or photonic pulses. All other symbols in any UNICODE standard character set are represented by combinations of variable duration pulses and/or and/or variable duration spaces between pulses. Chart 4 illustrates a sample of UNICODE symbols other than numbers, 0 through 9, represented by a sixteen-digit binary (0,1) number, in comparison with a modified version using combinations of variable duration pulses and/or variable duration spaces between pulses.

CHART 4

| SYMBOL | UNICODE REPRESENTATION (CURRENT) | UNICODE REPRESENTATION (PROPOSED) |
|---|---|---|
| A | 0000000001000001 | 00065 |
| I | 0000000001001001 | 00073 |
| S | 0000000001010011 | 00083 |

The present invention does not affect computer clock speed, but simply allows more relevant bits of information to be processed per unit of time or transmitted over a telecommunication network per unit of time. Chart 4 demonstrates that current UNICODE representation of data is sixteen bits long. The corresponding UNICODE symbol using the present invention's variable duration pulse scheme based on Chart 1, consists of five pulses and/or spaces between pulses. This represents an apparent speed increase for computing or telecommunication of 16 to 5, or 3.33 times faster for textual based operations.

The second embodiment of the present invention are single variable duration pulses and/or variable duration spaces between pulses representing numbers, 0 through 9, and combinations of variable duration pulses and/or variable duration spaces between pulses to represent all other standard ASCII symbols.

Second Embodiment

This modification changes the representation of numbers, 0 through 9, in any version of ASCII standard character sets from a eight digit binary number to a single variable duration and/or variable duration spaces between pulses electronic or photonic pulse. All other symbols in any ASCII standard character set are represented by combinations of variable duration pulses and/or variable duration spaces between pulses. Chart 5 illustrates a sample of ASCII symbols other than numbers, 0 through 9, represented by a eight digit binary (0,1) number, in comparison with a modified version using combinations of variable duration pulses.

CHART 5

| SYMBOL | ASCII 8859-1 REPRESENTATION (CURRENT) | ASCII 8859-1 REPRESENTATION (PROPOSED) |
|---|---|---|
| A | 01000001 | 065 |
| I | 01001001 | 073 |
| S | 01010011 | 083 |

The present invention does not affect computer clock speed, but simply allows more relevant bits of information to be processed per unit of time. Chart 5 demonstrates that current ASCII representation of data is eight bits long. The corresponding ASCII symbol using the present invention's variable duration pulse scheme based on Chart 1, consists of three variable duration pulses and/or variable duration spaces between pulses. This represents an apparent speed increase for computing or telecommunication of 8 to 3, or 2.67 times faster for textual based operations.

The embodiments of the present invention describes three methods of employing variable duration symbology to represent data used by computers and/or telecommunication networks. In the first method, only variable duration pulses are used to represent data. In the second method, only variable duration spaces between pulses are used to represent data. The third method uses a combination of both variable duration pulses and variable duration spaces between pulses to represent data.

In the third method, there are two alternatives in which a combination of both variable duration pulses and variable duration spaces between pulses can be used to represent data.

The first alternative method is called cascading. This is defined as variable duration pulses and variable duration spaces between pulses alternating to represent data. As an example, in Chart 6 the UNICODE character 15461 would be represented by the following cascade of variable duration pulses and variable duration spaces between pulses used to represent the data.

CHART 6

| UNICODE CHARACTER NUMBER | PULSE DURATION AND/OR SPACE DURATION BETWEEN PULSES (PICO-SECONDS) (SEE CHART 1) | PULSE OR SPACE |
|---|---|---|
| 1 | 50 | PULSE |
| 5 | 250 | SPACE |
| 4 | 200 | PULSE |
| 6 | 300 | SPACE |
| 1 | 50 | PULSE |

The second alternative method for using a combination of variable duration pulses and variable duration spaces between pulses is called double-coding. This is defined as the variable duration pulses used to represent a UNICODE character, and the variable duration spaces between pulses used to represent meta data. As an example, in Chart 7 the UNICODE character number 15461 would be represented by the variable duration pulses, and meta data number 6739 is represented by the variable duration spaces between pulses. This meta data, or "XML-type" tagging would be used to drive look-up tables in which the number represented by the variable duration spaces between pulses was equivalent to a tag word, not just a single character. Using only the four variable duration spaces between pulses would allow a table of 9,999 meta data or "XML-type" tags to be created. If an extra pulse, or an "anchor pulse" were used, five variable duration spaces between pulses would allow a table of 99,999 meta data or "XML-type" tags to be created, etc.

Extending the use of encoding entire words as described above with the meta tags could also be applied to combinations of UNICODE characters which make up words. As an example, an eight bit number represented by eight variable duration pulses and/or variable duration spaces between pulses would represent 99,999,999 words. As an example, the world "elephant" would require eight UNICODE characters, or 128 bits of data. By using an eight bit number in a look-up table, such as 19876543 to represent the word "elephant" would save 120 bits of data.

CHART 7

| UNICODE CHARACTER NUMBER | META DATA NUMBER | PULSE DURATION AND/OR SPACE DURATION BETWEEN PULSES (PICO-SECONDS) (SEE CHART 1) | PULSE OR SPACE |
|---|---|---|---|
| 1 | | 50 | UNICODE PULSE |
| | 6 | 300 | META SPACE |
| 5 | | 250 | UNICODE PULSE |
| | 7 | 350 | META SPACE |
| 4 | | 200 | UNICODE PULSE |
| | 3 | 150 | META SPACE |
| 6 | | 300 | UNICODE PULSE |
| | 9 | 450 | META SPACE |
| 1 | | 50 | UNICODE PULSE |

In an alternate embodiment of the present invention a constant duration pulse is broadcast at varying times from the pulse neutral position to represent numbers 0-9, as shown in Chart 8. This embodiment would have particular benefit in a time modulated, ultra wideband system

CHART 8

| NUMBER | PULSE START TIME DIFFERENCE FROM NEUTRAL POSITION OF THE PULSE (PICO-SECONDS) |
|---|---|
| 1 | 50 |
| 2 | 100 |
| 3 | 150 |
| 4 | 200 |
| 5 | 250 |
| 6 | 300 |
| 7 | 350 |
| 8 | 400 |
| 9 | 450 |
| 0 | 0 |

It is important to note that in the scheme represented in Chart 1, the following mathematically significant relationship exists:

Integer (0-9)=integer X pulse time difference (50 pico-seconds)

Even though Chart 1 depicts the above relationship, it should be obvious to those skilled in the art that any interval of pulse time difference can occur. For example, the pulse time difference could be 40 pico-seconds, or 100.7 pico-seconds, or any other difference from its neutral position.

Using this alternative method of representing the numbers 0-9 supports the examples of Charts 2, 3, 4, and 5 which demonstrate base 10 math and new representations for UNICODE and ASCII symbols.

The present invention also provides for an alternate method of inputting variable duration symbology into a computer using a new bar code symbology based on variable duration pulses and/or variable duration spaces between pulses, as described in Chart 1. The bar code symbology would have various width bars and spaces that correspond mathematically to the variable duration pulse and variable duration spaces between pulses described in Chart 9.

CHART 9

| NUMBER | VARIABLE DURATION PULSE AND/OR VARIABLE DURATION SPACE BETWEEN PULSES (PICO-SECONDS) | WIDTH OF BAR CODE BAR AND/OR SPACES BETWEEN BARS (INCHES) |
|---|---|---|
| 1 | 50 | .010 |
| 2 | 100 | .020 |
| 3 | 150 | .030 |
| 4 | 200 | .040 |
| 5 | 250 | .050 |
| 6 | 300 | .060 |
| 7 | 350 | .070 |
| 8 | 400 | .080 |
| 9 | 450 | .090 |
| 0 | 500 | .100 |

The width of the bar code bars and/or spaces between bars in Chart 8 are representative of one scheme. One skilled in the art will recognize that other bar code bar widths between bars would be applicable.

The present invention will require fewer data conversions than are now required to capture bar coded data and convert into analog data that is human readable. Currently, a bar code reader captures bar coded data, converts it to an ASCII symbol, then to a binary coded number, then back to ASCII, then to a human readable symbol. The present invention will enable a bar code reader to capture bar coded data using the new symbology, convert it directly to a variable duration pulse and/or variable duration space between electronic or photonic pulses, then to a human readable symbol. The new bar code symbology is more efficient than existing bar code symbologies, as it will use two bars and one space between bars to represent an ASCII symbol, versus the five bars and four spaces that are currently required using Code 39, for example.

A general description as well as a preferred embodiment of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention.

What is claimed is:

1. A method of providing symbology for representing data in transmission of ultra wideband pulses using a baseband signal to increase efficiency of the transmission, comprising:
    determining a plurality of subsets of bit sequences within a set of bit sequences;
    representing each of the plurality of subsets of bit sequences with a variable duration ultra wideband pulse or a variable ultra wideband duration space unconstrained by time slots;
    assigning an ultra wideband pulse duration or an ultra wideband pulse spacing to each of the plurality of subsets of bit sequences wherein each of the plurality of subsets of bit sequences represents a plurality of bits; and
    using the ultra wideband pulses and the ultra wideband spaces to transmit data, wherein at least one of the plurality of subsets being represented by one of the ultra wideband pulse durations and an adjacent one of the plurality of subsets being represented by one of the ultra wideband space durations.

2. The method of claim 1 wherein the bit sequences correspond to UNICODE symbology.

3. The method of claim 2 wherein the subset of bit sequences correspond with number symbols 0 to 9.

4. The method of claim 1 wherein the bit sequences correspond to ASCII symbology.

5. The method of claim 4 wherein the subset of bit sequences correspond with number symbols 0 to 9.

6. The method of claim 1 further comprising transmitting the ultra wideband pulses.

7. The method of claim 1 wherein the ultra wideband pulses are photonic ultra wideband pulses.

8. The method of claim 1 wherein the ultra wideband pulses are electronic ultra wideband pulses.

9. A method of providing pulse symbology for representing data in transmission of pulses using a baseband signal in a time-modulated ultra wideband system to increase efficiency of the transmission, comprising:
    determining a plurality of subsets of bit sequences wherein each of the plurality of subsets of bit sequences comprise a plurality of bits;
    representing each of the plurality of subsets of bit sequences as a variable ultra wideband pulse duration or a variable ultra wideband duration space unconstrained by time slots;
    assigning a single ultra wideband pulse duration or a single ultra wideband pulse spacing to each of the plurality of subsets of bit sequences to thereby represent data;
    transmitting data from the time modulated ultra wideband system using the ultra wideband pulses and the ultra wideband spaces; and
    wherein at least one of the plurality of subsets being represented by an ultra wideband pulse duration and an adjacent one of the plurality of subsets being represented by an ultra wideband space duration.

10. The method of claim 9 wherein both single variable duration ultra wideband pulses and single variable duration ultra wideband spaces represent bit sequences.

11. The method of claim 9 wherein the transmission comprise a continuous plurality of ultra wideband pulse and ultra wideband spaces, the ultra wideband pulses each having a single variable duration associated with one of the bit sequence and the ultra wideband spaces each having a single variable duration associated with one of the bit sequences.

12. The method of claim 9 wherein the bit sequences correspond to UNICODE symbology.

13. The method of claim 9 wherein the bit sequences correspond to number symbols 0 to 9.

14. The method of claim 9 wherein the bit sequences correspond to ASCII symbology.

15. The method of claim 9 further comprising transmitting the ultra wideband pulses.

16. A method of providing pulse symbology for representing data in transmission of ultra wideband pulses in a baseband signal of a time-modulated ultra wideband system to increase efficiency of the transmission, comprising:
    representing character symbols using number symbols 0 to 9;
    representing each of the number symbols 0 to 9 with a single duration ultra wideband space that is variable or a single duration ultra wideband pulse that is variable to thereby represent data using ultra wideband pulses for use in the time-modulated ultra wideband system;

transmitting using the time-modulated ultra wideband system a baseband signal transmission comprised of single duration ultra wideband spaces and single duration ultra wideband pulses, each of the single duration ultra wideband spaces and the single duration ultra wideband pulses representing one of the number symbols.

17. The method of claim 16 wherein the character symbols are ASCII characters.

18. The method of claim 16 wherein the character symbols are Unicode characters.

19. The method of claim 16 wherein the representing each of the number symbols 0 to 9 with a single duration ultra wideband space that is variable or a single duration ultra wideband pulse that is variable to thereby represent data using ultra wideband pulses for use in the time-modulated ultra wideband system comprises representing each of the number symbols 0 to 9 with the single duration ultra wideband space that is variable and the single duration ultra wideband pulse that is variable to thereby represent data using ultra wideband pulses for use in the time-modulated ultra wideband.

20. A method of providing symbology for representing data in transmission of ultra wideband pulses to increase efficiency of the transmission, comprising:

determining a plurality of subsets of bit sequences within a set of bit sequences;

representing each of the plurality of subsets of bit sequences with a variable duration ultra wideband pulse and a variable duration ultra wideband space;

assigning an ultra wideband pulse duration and an ultra wideband pulse spacing to each of the plurality of subsets of bit sequences wherein each of the plurality of subsets of bit sequences represents a plurality of bits; and using the ultra wideband pulses and ultra wideband spaces to transmit data, alternating ultra wideband pulses and ultra wideband spaces in a baseband signal.

* * * * *